July 13, 1954     S. FABER     2,683,321
FISH-LANDING NET
Filed April 6, 1950
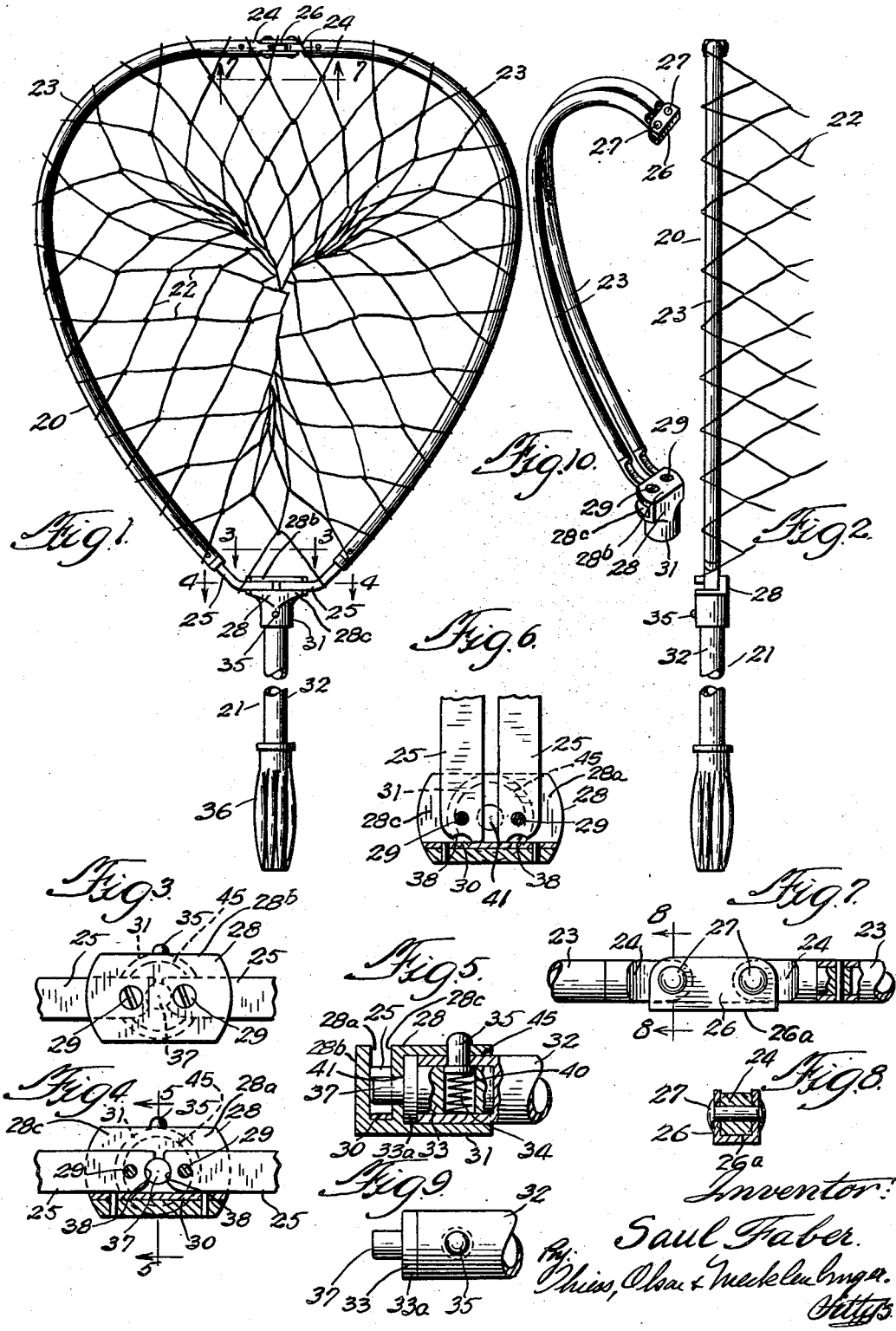
Inventor:
Saul Faber.

Patented July 13, 1954

2,683,321

UNITED STATES PATENT OFFICE 2,683,321

FISH-LANDING NET

Saul Faber, Chicago, Ill., assignor to Chesal Industries, Chicago, Ill., a copartnership Application April 6, 1950, Serial No. 154,266

3 Claims. (Cl. 43—12)

This invention relates to improvements in fish-landing nets and has for an object the provision of such a net which is relatively light, sturdy and strong, and which may be readily folded up into smaller compass for carrying and protection and is readily and quickly unfolded and made ready for use.

Other objects of this invention are, severally, to provide a foldable net of simple construction and few parts which fold and unfold and go together in a natural, obvious and foolproof manner, in which there are no small parts to be dropped or lost, no complicated or difficult ritual to be followed in assembling and disassembling, and a folding net in which the net frame sections are automatically locked in open position and cannot collapse in use.

Further objects and advantages will appear from the description and claims to follow, in connection with the accompanying drawings, which illustrate, by way of example but not of limitation, an embodiment of the invention, and in which—

Fig. 1 is a face view of the net with the net frame open and the handle attached, all in position for use, the handle being shown broken to indicate any desired length;

Fig. 2 is an edge view of the same;

Fig. 3 is a detail inside face view of the hinge member at the handle end of the net frame sections, taken from the line 3—3 of Fig. 1;

Fig. 4 is a section view of the same parts taken on the line 4—4 of Fig. 1;

Fig. 5 is a cross section on the line 5—5 of Fig. 4 and showing the connection of the handle with said hinge member;

Fig. 6 is a view like Fig. 4 but with the handle disconnected and the net frame sections in folded position;

Fig. 7 is a view on the line 7—7 of Fig. 1 of the hinge member joining the outer ends of the net frame sections;

Fig. 8 is a section on the line 8—8 of Fig. 7 and showing the pivotal connection of the net section to the hinge member joining the outer opposed ends of said sections;

Fig. 9 is a top view of the inner end of the handle of the net; and

Fig. 10 is a perspective view of the net frame with its sections in folded position.

Referring to these drawings, the landing-net device comprises a net frame 20 and a handle 21 and, of course, a funnel-shaped net 22 which is strung on and attached as usual to the frame 20 and hangs therefrom.

The frame when spread open in flat form for use, as indicated in Figs. 1 and 2, is preferably of a general heart-shaped oval, though it may be circular or any form desired. It is made in two similar or half sections 23, 23 hinged together at their opposed ends at diametrically opposite inner and outer points, so as to be foldable together upon each other, as indicated in Fig. 10. These sections 23 are preferably of metal tubing for lightness and strength, and for still further lightness, of aluminum or other suitable material. The ends of these frame sections 23 are flattened, the better to fit into the hinge members, as later explained, by inserting a shouldered plug or short rod of steel or other strong metal, riveting or otherwise securing it in the end of the tube 23 and flattening the projecting end for the hinge purposes. Thus, at the outer ends of sections 23 the ends 24 of the tubes 23 may be seen, as also in Fig. 7. Similar strong and hard metal ends 25 are provided for the inner ends of frame sections 23 and may be secured to the tubes in the same way.

The metal hinge or link member 26 at the outer end or side of the net frame, as more clearly seen in Figs. 7 and 8, is of channel or U-form in cross section and long enough to overlap the two flattened ends 24 of the frame sections, which are pivotally secured to and in the link or hinge member 26 by the rivets or similar pivotal means 27, 27. This hinge or link, with its open side and the pivotal connection of the sections between the two side walls thereof, allows the sections to be swung or folded together, as in Fig. 10, or to spread and lie out flat in the same plane as in Figs. 1 and 2. At the same time the bottom wall 26a of the U-link at the ends thereof engages the edges of the flattened ends 24 and acts as a stop to tend to prevent the frame sections from opening or swinging beyond or back of the open face plane of said sections of Figs. 1 and 2.

The hinge and link member 28 at the other or inner side or end of the net frame, the handle end or side, is preferably of metal having a U-slot or channel 28a therein corresponding to that of the other hinge member 26, in which the flattened ends 25 of the net frame sections 23 are pivoted on suitable screws 29. These screws, preferably with countersunk heads, pass through the inner wall 28b of the slot or channel of the hinge, through the apertures in the flat ends 25 of the net sections and securely thread into dead-end holes in the outer or opposite wall 28c of the slot or channel 28a, thereby providing smooth exteriors on both slot walls.

The net frame sections 23 may thus pivot on the said screws 29 in the hinge member 28 in folding and unfolding, as indicated in Figs. 1, 6 and 10, and lie substantially parallel to each other when folded, as shown in Fig. 10.

A suitable shim or wear plate or strip 30, Figs. 4, 5 and 6, preferably lines the bottom wall of the slot 28a in hinge member 28, and may be suitably riveted in place as shown in Figs. 4 and 6. When the sections are opened, Fig. 4, they are supported in that position by the strip 30, and when closed, Fig. 6, their ends engage the strip and tend to be held erect or at right angles thereto.

This hinge member 28 also provides means for connection of the detachable handle 21 with the net frame. For this purpose the member is provided with an outer socket extension 31 which is perpendicular to the plane of the wall 28c of the hinge slot. The handle includes preferably a circular metal tube 32 and the socket 45 in the extension 31 to receive its end is the same in cross section. This construction is shown more in detail in Figs. 5 and 9. As here shown, a solid plug 33 having circumferentially projecting flange 33a is tightly fitted and secured in any desired way in the end of tube 32. The two side faces of said flange 33a may be considered as shoulders, the one abutting the end of the handle tube 32 in the assembled plug and tube and the other adapted to engage the wall 28c when the handle is in the socket 45. A cross aperture 40 in the plug contains a coil spring 34 and a headed pin 35 outwardly pressed by the spring. The outer end of the pin 35 is rounded, as indicated, for ease in attaching and removing the handle. Thus, to insert the handle in the socket the pin is depressed by the thumb or finger until its rounded end engages the edge of the socket, when a further push on the handle causes the pin to depress until the handle slides into the socket. When the corresponding aperture in the socket wall is reached, the pin springs into it, as shown in Fig. 5, and the handle is securely attached to the hinge member. Withdrawal of the handle is effected in a similar manner. The rounded end of the pin 35 is depressed by the fingers, acompanied by a pull and possibly a twist of the handle, until the inner edge of the socket aperture engages the rounded surface of the pin, when the latter will be completely depressed to free the handle and permit its ready withdrawal from the socket.

Thus, the pin 35 not only secures the handle lengthwise in the socket but prevents the rotation of the handle in the socket, whereby full control of the net frame by the handle is obtained. The pin aperture may be located rotatively at any desired place around the socket extension, but is most conveniently placed where shown.

This handle may be of any desired length, as is intended to be indicated by the break therein shown in Figs. 1 and 2, or it may be of an extensible telescoping tube type well known in the art. It is preferably of aluminum or other light metal and is sturdy and strong. A handhold 36 of rubber or other suitable material may be mounted on the outer end of the handle tube which grips the tube and affords a good hand grip thereon for manipulation of the net.

To prevent the net frame sections from folding and the collapse of the net when in use, locking means are provided to lock the sections in their open flat position, and this locking means is preferably controlled by the handle, and further may be so constituted that the sections cannot be locked from folding except in their wide open position or locked against unfolding by the premature connection of the handle with the sections and that the handle cannot be attached to the net frame except when the sections are opened up flatly. Thus, accidental collapse of the net is avoided, since it cannot be used except when the handle is attached, and the handle cannot be operatively attached save only when the sections are opened fully, which is the natural way and time of applying it.

This locking is accomplished in this instance by providing the plug 33 in the end of the handle with the inner projecting pin 37. This pin, when the handle is inserted in the hinge socket and the net frame sections are in flat open position, fits into the recesses 38, 38 in the ends 25 of the net sections, and prevents said sections from moving from that position. They are held in that position by the pin 37 and cannot collapse while the pin is inserted, and that is when the handle is attached to the frame. The parts are so formed that in no other position of the sections is the pin 37 able to pass between them into the recesses 38 than in the position of Fig. 4 which is the flat open position of the sections. As noted in Fig. 5, the pin 37 passes through a suitable close-fitting aperture 41 in the wall 28c of the slot 28a and thence between the ends of the sections. It is therefore strongly supported adjacent said sectional ends and is made of metal not readily crushed, sheared or deformed by said ends in tending to turn on their pivots 29.

The net 22 may be of the usual funnel form and construction and is looped around and suspended by the net frame, as indicated. When the sections of the frame are folded together, as indicated in Fig. 10, the net, which is then collapsed, may be wrapped around the folded sections without removing the same from the sections. The handle, which necessarily, as explained, is removed from the net frame at that time, may be placed alongside the folded sections, the whole taking up relatively small space for packing or packaging. When it is desired to use the net, it is very quickly put in condition therefor. The net may be unrolled by swinging the sections around in a circle while held in one hand (it may be rolled up in the same way), the two sections spread out flatly and the handle quickly inserted, pin 35 responding to finger pressure to enable the handle to be inserted into the socket. This is not only the natural way to handle the two parts, but they cannot go together in any other way, and when so put together the sections are locked in the open useable position and cannot collapse through inadvertence or otherwise or failure properly to tighten some part. And folding up the net after use is equally simple and expeditious. The pin 35 can be depressed by the finger while pulling on the handle with the same hand, the net frame being grasped by the other hand. With the handle out, the sections may be folded instantly and the net wrapped around the same.

The nets, of course, are not removed from the frame for such folding and unfolding, and ordinarily are of long life, but if it is desired to use a net of different mesh or for other reason to change the same, one of the screws 29 may be taken out of the hinge member 28, the end of the section separated slightly from the hinge and the net be threaded thereover for both sections of the entire frame.

I claim:

1. A landing net comprising a foldable net frame and a detachable handle therefor, said frame being in two sections, hinge members to which the opposed ends of the sections are pivoted and enabling the sections to be opened flatly or to be folded upon each other, the said handle being detachably connected to one hinge member when the said sections are wide open, and a pin on the attachable end of the handle engaging the ends of said sections and locking them in that position when the handle is so attached, the said sections having portions adapted to move into the path of attachment of said pin and block the attachment of the pin and handle to the hinge when the sections are moved out of the said open flat position.

2. In a landing net, a foldable net frame comprising half sections, hinge members to which the half sections of the frames are attached, pivot means for attaching said half sections to said hinge members, one hinge member having a handle socket axially perpendicular to the plane of movement of the pivoted ends of the sections and between them, and a handle for the net adapted to be inserted in said socket and having a pin on its inserted end, said pin engaging between the ends of the said sections between their pivots when inserted in the socket and the sections are in open and flat position to thereby lock the sections in open position, and portions of at least one of the said sections when out of the said open position adapted to be moved into and lie across the path of insertion of said pin and block such insertion of said pin and the handle into the socket to thereby prevent the operative attachment of the handle to the net at such times.

3. A landing net comprising a foldable net frame and a detachable handle therefor, said frame being in sections, hinge members therefor enabling the sections to be opened flatly or be folded together, and means for attaching the handle to one of said members, said means including a pin on the end of the handle, and said member having an orifice to receive the pin, and the said sections having portions adapted to extend into the path of said pin as it is moved past said orifice and block the same except when the sections are moved into their flat open position.

References Cited in the file of this patent

UNITED STATES PATENTS

| Number | Name | Date |
| --- | --- | --- |
| 389,335 | Spear | Sept. 11, 1888 |
| 823,113 | French et al. | June 12, 1906 |
| 956,803 | Fromm | May 3, 1910 |
| 1,169,311 | Walter | Jan. 25, 1916 |
| 1,430,221 | Dukas | Sept. 26, 1922 |
| 2,457,922 | Robinson | Jan. 4, 1949 |
| 2,515,685 | Ash | July 18, 1950 |